United States Patent
Guo et al.

(10) Patent No.: US 7,865,660 B2
(45) Date of Patent: Jan. 4, 2011

(54) CALIBRATION OF READ/WRITE MEMORY ACCESS VIA ADVANCED MEMORY BUFFER

(75) Inventors: Zhendong Guo, Shanghai (CN); Larry Wu, Sunnyvale, CA (US); Xiaorong Ye, Shanghai (CN); Gang Shan, Shanghai (CN)

(73) Assignee: Montage Technology Group Ltd., George Town, Grand Cayman (KY)

( * ) Notice: Subject to any disclaimer, the term of this patent is extended or adjusted under 35 U.S.C. 154(b) by 336 days.

(21) Appl. No.: 11/735,915

(22) Filed: Apr. 16, 2007

(65) Prior Publication Data

US 2008/0256282 A1 Oct. 16, 2008

(51) Int. Cl.
*G06F 12/00* (2006.01)
*H03L 7/06* (2006.01)
*H03L 7/00* (2006.01)
*G11C 7/10* (2006.01)
*G11C 7/00* (2006.01)
*G01R 13/00* (2006.01)
*G01R 35/00* (2006.01)
*G01R 25/00* (2006.01)
*G01D 18/00* (2006.01)

(52) U.S. Cl. ............... 711/105; 327/157; 327/161; 365/189.07; 365/194; 702/72; 702/79; 702/89; 702/106

(58) Field of Classification Search .......... 711/167, 711/105; 710/106; 365/189.07, 194; 702/72, 702/79, 89, 106; 327/157, 161
See application file for complete search history.

(56) References Cited

U.S. PATENT DOCUMENTS

| | | | | |
|---|---|---|---|---|
| 5,703,489 A * | 12/1997 | Kuroe | ................... | 324/601 |
| 6,390,579 B1 * | 5/2002 | Roylance et al. | ............... | 347/9 |
| 6,738,918 B2 * | 5/2004 | Toda | ................... | 713/400 |
| 7,668,679 B2 * | 2/2010 | Best | ................... | 702/106 |
| 2003/0041224 A1 * | 2/2003 | Toda | ................... | 711/167 |
| 2006/0259666 A1 * | 11/2006 | Lee | ................... | 710/62 |
| 2007/0097264 A1 * | 5/2007 | Risk et al. | ................... | 348/552 |
| 2008/0098142 A1 * | 4/2008 | Fujimoto | ................... | 710/106 |

OTHER PUBLICATIONS

JEDEC standard JESD79-3 (proposed), "DDR3 SDRAM Specification", Dated Oct. 6, 2006.
JEDEC standard JESD82-20, "FB-DIMM: Advanced Memory Buffer (AMB)", Dated Mar. 2007.
JEDEC standard JESD206, "FB-DIMM architecture and protocol", Dated Jan. 2007.

* cited by examiner

*Primary Examiner*—Kevin L Ellis
*Assistant Examiner*—Mehdi Namazi
(74) *Attorney, Agent, or Firm*—Luy Mei (57) ABSTRACT

Methods and apparatuses to calibrate read/write memory accesses through data buses of different lengths via advanced memory buffers. One embodiment includes an advanced memory buffer (AMB) having: a plurality of ports to interface respectively with a plurality of data buses; a port to interface with a common clock bus for the plurality of data buses; and an adjustable circuit coupled with the plurality of ports to level delays on the plurality of data buses. In one embodiment, the data buses have different wire lengths between the dynamic random access memory (DRAM) memory chips and the advanced memory buffer (AMB).

19 Claims, 6 Drawing Sheets

CALIBRATION OF READ/WRITE MEMORY ACCESS VIA ADVANCED MEMORY BUFFER

FIELD OF THE TECHNOLOGY

At least some of the embodiments provided in the disclosure relate to Fully Buffered Dual Inline Memory Module (FB-DIMM) and Advanced Memory Buffer (AMB).

BACKGROUND

Conventional memory systems use un-buffered or registered DIMMs that are connected by means of a stub bus, in which the memory modules are connected to a single channel. When the number of modules in the channel increases, the channel performance decreases, limiting the performance of the memory system.

To increase the performance of the dynamic random access memory (DRAM) system of a computer system, the technology of Fully Buffered Dual In-line Memory Module (FB-DIMM) has been developed.

FB-DIMM technology uses high-speed, serial, point-to-point connections between memory modules and the memory controller. The host memory controller is connected to a first memory module; and a first memory module is connected to a second memory module; etc. Thus, the load of each link is constant. No branch is needed in this type of point-to-point connection. The memory modules operate at a constant load environment regardless of the number of memory modules used in the system.

Advanced Memory Buffer (AMB) is a portion of a FB-DIMM which provides the point-to-point link in the memory system. Typically, each FB-DIMM has an advanced memory buffer (AMB), which handles FB-DIMM channel and memory requests to and from the local FB-DIMM and forwards the requests to other FB-DIMMs. Such architecture can be used to design large-capacity and high-bandwidth memory subsystems for servers and workstations.

An AMB typically includes two serial ports and a parallel port. One of the serial port is for connecting to the host memory controller or the AMB of the adjacent memory module that is closer to the host memory controller; the other serial port is for connecting to the AMB of the adjacent memory module that is further away from the host memory controller; and the parallel port is for connecting to the bus to the memory chips that are on the same memory module as the AMB.

For example, serial data from the host memory controller sent through a downstream serial link to the AMB is temporarily buffered in the AMB before being sent to the DRAM chips on the memory module. The serial data contains the address, data and command information, which is converted in the AMB and placed onto the DRAM bus on the memory module. The AMB writes in and reads out from DRAM chips as instructed by the memory controller. The data retrieved from the DRAM is converted to serial data in the AMB and sent to the memory controller through an upstream serial link.

SUMMARY OF THE DESCRIPTION

Methods and apparatuses to calibrate read/write memory accesses through data buses of different lengths via advanced memory buffers are described herein. Some embodiments are summarized in this section.

In one embodiment, an integrated circuit, such as an advanced memory buffer (AMB), includes: a plurality of ports to interface respectively with a plurality of data buses; a port to interface with a common clock bus for the plurality of data buses; and an adjustable circuit coupled with the plurality of ports to level delays on the plurality of data buses. In one embodiment, the data buses have different wire lengths between the dynamic random access memory (DRAM) memory chips and the advanced memory buffer (AMB).

In one embodiment, the plurality of data buses are point-to-point buses to memory chips, such as a double data rate (DDR) memory bus or a quad data rate (QDR) memory bus.

In one embodiment, the adjustable circuit includes a plurality of adjustable delay blocks and a calibration controller. The calibration controller determines a phase difference between data sampled from a first data bus and data sampled from a second data bus to adjust a delay block coupled with the second data bus. The delay block is adjusted to reduce the phase difference.

In one embodiment, the first data bus has longest delay among the plurality of data buses; and data received from other data buses are delayed by the adjustable delay blocks to phase align the data received over the data buses.

In one embodiment, duration a calibration phase, a same data pattern is written into different memory chips via the plurality of data buses; and the data pattern is read through the plurality of data buses concurrently to adjust the plurality of delay blocks. For example, the calibration controller determines a phase difference between data sampled from a first data bus and data sampled from a third data bus to adjust a delay block coupled with the third data bus; and the calibration controller concurrently adjusts the delay block coupled with the second data bus and the delay block coupled with the third data bus during the calibration phase.

In one embodiment, the calibration controller determines a phase difference between data sampled from a first data bus and a read clock to adjust a delay block coupled with the first data bus.

In one embodiment, the adjustable circuit further includes a plurality of adjustable delay blocks to delay data to be transmitted through the plurality of data buses to phase align data at destinations of the data buses with a write clock transmitted over the clock bus. In one embodiment, the adjustable circuit further includes an adjustable delay block to adjust a phase of the write clock for transmission over the clock bus.

In one embodiment, a memory system includes: a plurality of memory chips; a common clock bus coupled with the plurality of memory chips; a plurality of point to point data buses coupled with the plurality of memory chips; and a memory buffer coupled with the plurality of memory chips via the common clock bus and the plurality of point to point data buses. The point to point data buses have different lengths between the memory chips and the memory buffer. The memory buffer has an adjustable circuit to level delays on the plurality of data buses.

In one embodiment, the memory buffer includes an advanced memory buffer (AMB) for a Fully Buffered Dual Inline Memory Module (FB-DIMM).

In one embodiment, the memory buffer includes a calibration controller to concurrently adjust delays for reading from the plurality of data buses during a calibration phase.

One embodiment includes a method to be performed during a calibration phase of a data processing system having a plurality of data buses that have different wire lengths. The method includes: adjusting first delays applied to data to be transmitted over the plurality of data buses relative to a common write clock for correct write operations over the data buses; and adjusting second delays applied to data received over the plurality of data buses relative to a common clock to reduce phase differences among the received data.

In one embodiment, the plurality of data buses are a plurality of dual data rate memory buses having different wire lengths; the first and second delays are integrated on an advanced memory buffer (AMB); and the second delays applied to the data received over the plurality of data buses are adjusted concurrently by the advanced memory buffer (AMB) during the calibration phase.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the disclosure are not necessarily references to the same embodiment; and, such references mean at least one.

Figure 1:
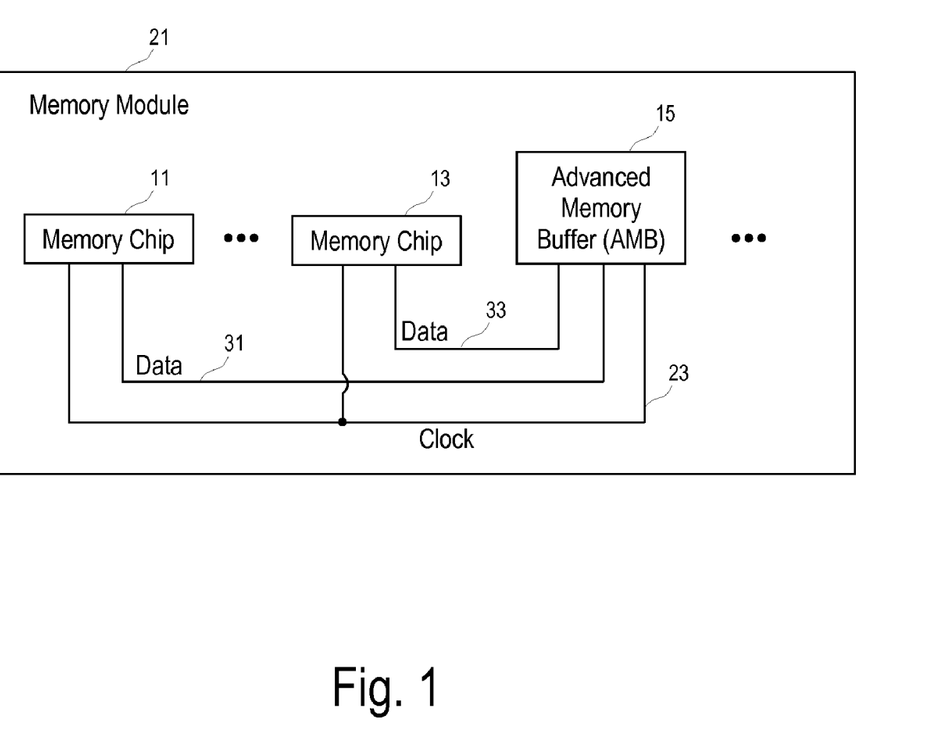
FIG. 1 shows a memory system according to one embodiment.

FIG. 1 shows a memory system according to one embodiment. In FIG. 1, a memory module (21), such as a Fully Buffered Dual Inline Memory Module (FB-DIMM) includes a plurality of memory chips (e.g., 11, . . . , 13) and an advanced memory buffer (AMB) (15).

The advanced memory buffer (AMB) (15) handles the requests to and from the memory chips (11, . . . , 13), such as dynamic random access memory (DRAM), and forwards the requests to the other FB-DIMMs or the host memory controller.

In FIG. 1, the data buses between the advanced memory buffer (AMB) (15) and the memory chips (11, . . . , 13) are point-to-point connections (31, . . . , 33) which generally have with different wire lengths. In FIG. 1, the common clock bus (23) is shared among the memory chips (11, . . . , 13) via a multi-drop configuration.

In a read operation, the memory chips (11, . . . , 13) launch the data based on the clock received from the clock bus (23). Due to the trace differences and receiver mismatch, the data signals arrived at the input port of the advanced memory buffer (AMB) generally have different phases.

In one embodiment, the advanced memory buffer (AMB) is designed to have an adjustable circuit to level or reduce the phase differences among the data signals received over the point-to-point connections (31, . . . , 33).

In one embodiment, a point-to-point data bus includes a plurality of parallel wires for data signals and for data strobe. In the advanced memory buffer (AMB) (15) the data signals are sampled according to the respective data strobe and then sampled according to a common read clock to eliminate the phase differences between data received from different point-to-point data buses. As the data speed increase, the phase differences among the data buses may cause difficulties in sampling the data signals according to the common read clock.

In one embodiment, the advanced memory buffer (AMB) (15) includes an adjustable circuit to reduce the phase differences between data received from different point-to-point data buses before the data signals are sampled by the common read clock. Thus, the time margin and jitter tolerance of the system can be increased.

In a write operation, the advanced memory buffer (AMB) (15) sends the data out according to the write clock. Due to the trace differences and receiver mismatch, the data signals generally arrive at the memory chips (31, . . . , 33) at different phases via different point-to-point data buses. The phase differences may cause errors when the memory chips (31, . . . , 33) sample the data transmitted from the advanced memory buffer (AMB) (15), especially at a high data speed.

In one embodiment, the advanced memory buffer (AMB) (15) is designed to include an adjustable circuit to level or reduce the phase differences between the arrived data signals transmitted over the point-to-point connections (31, . . . , 33) and the clock signals transmitted over the clock bus (23).

Through the use of adjustable circuits in a calibration phase, the phase differences due to the differences in wire lengths between data buses and/or the clock bus can be reduced to increase time margin to read/write the memory chips (31, . . . , 33) via the advanced memory buffer (AMB) (15). In one embodiment, the adjustable circuits are used to automatically absorb the skews among the data transmitted over different buses and increase the read/write time margin and jitter tolerance.

In one embodiment, the advanced memory buffer (AMB) (15) is integrated on a single semi-conductive chip.

Figure 2:
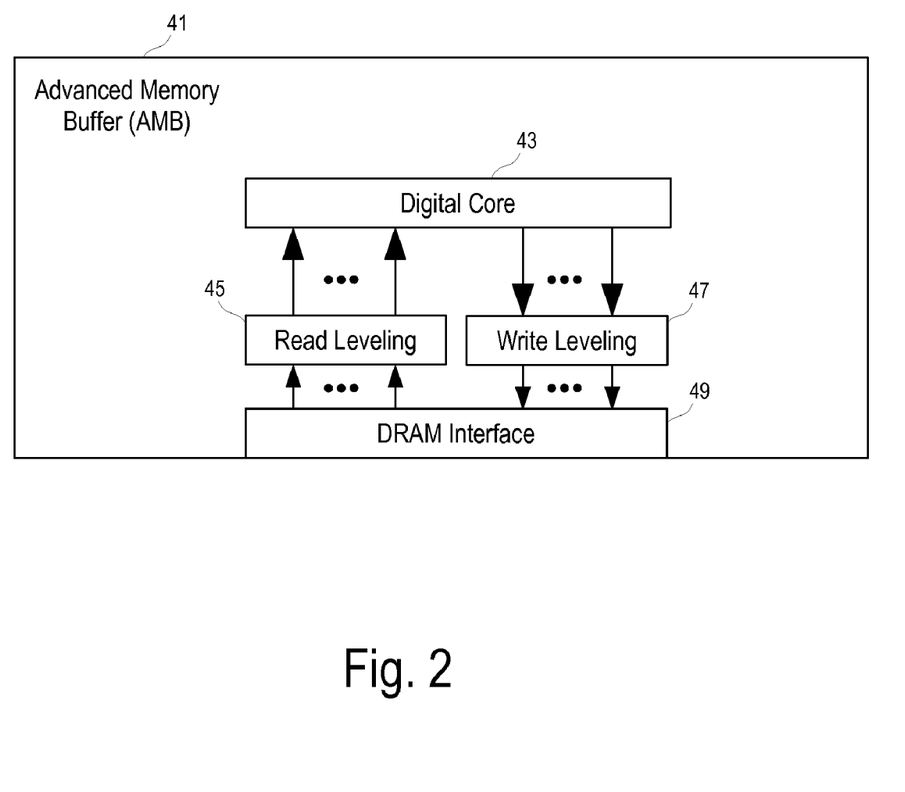
FIG. 2 shows a block diagram of an advanced memory buffer (AMB) according to one embodiment.

FIG. 2 shows a block diagram of an advanced memory buffer (AMB) according to one embodiment. In FIG. 2, the advanced memory buffer (AMB) (41) includes a read leveling circuit (45) and a write leveling circuit (47) coupled between the DRAM interface (49) and the digital core (43) of the advanced memory buffer (AMB) (41). The DRAM interface (49) may include a plurality ports for interface with a plurality of point-to-point data buses (as illustrate in FIG. 1).

In one embodiment, the advanced memory buffer (AMB) (41) transmits and receives data to and from the DRAMs through the DRAM interface, which may include a double data rate (DDR) memory bus interface or a quad data rate (QDR) memory bus interface.

In read operations, the data signals from the different data buses are de-skewed and calibrated to align with each other by the read leveling circuit (45) before the aligned data signals are sampled according to the common read clock of the advanced memory buffer (AMB) (41).

In write operations, the data signals for different data buses are pre-skewed by the write leveling circuit (47) before they are transmitted over the data buses so that they can align with their respective clocks at the input ports of the memory chips.

Figure 3:
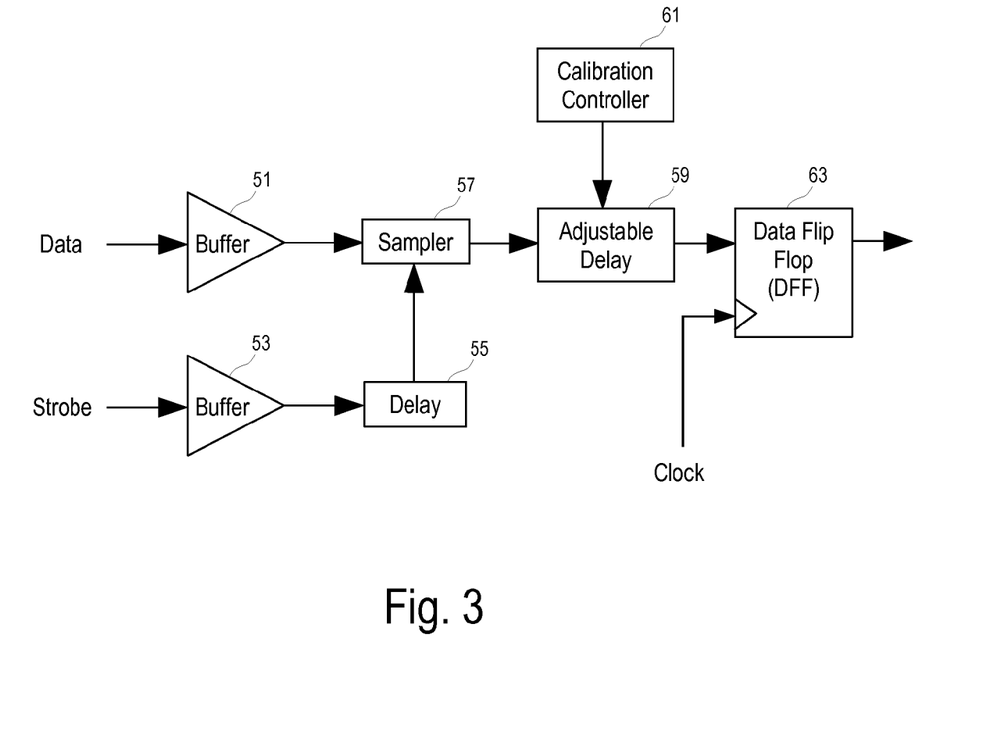
FIG. 3 shows a read data calibration according to one embodiment.

FIG. 3 shows a read data calibration according to one embodiment. In FIG. 3, after the data and strobe signals from a data bus are received at the buffers (51 and 53), the strobe signal is delayed (55) (e.g., phase shifted 90 degrees) to control the sampler (57). The sampler (57) generates a sampled output of the data signal which is delayed by an adjustable delay element (59), before the sampled output is further sampled by the data flip flop (DFF) (63) according to a common read clock. Thus, the output of the data flip flop (DFF) (63) is synchronized with the common read clock.

In one embodiment, the adjustable delay (59) is controlled by a calibration controller (61) to reduce the phase differences among sampled data signals received from different data buses.

The calibration controller (61) may be manually controlled, or controlled via software, or controlled partially via software partially via hardware.

Alternatively or in combination, a set of adjustable delay elements can be used before the delay block (55) and/or the sampler (57) to phase align the received data.

Figure 4:
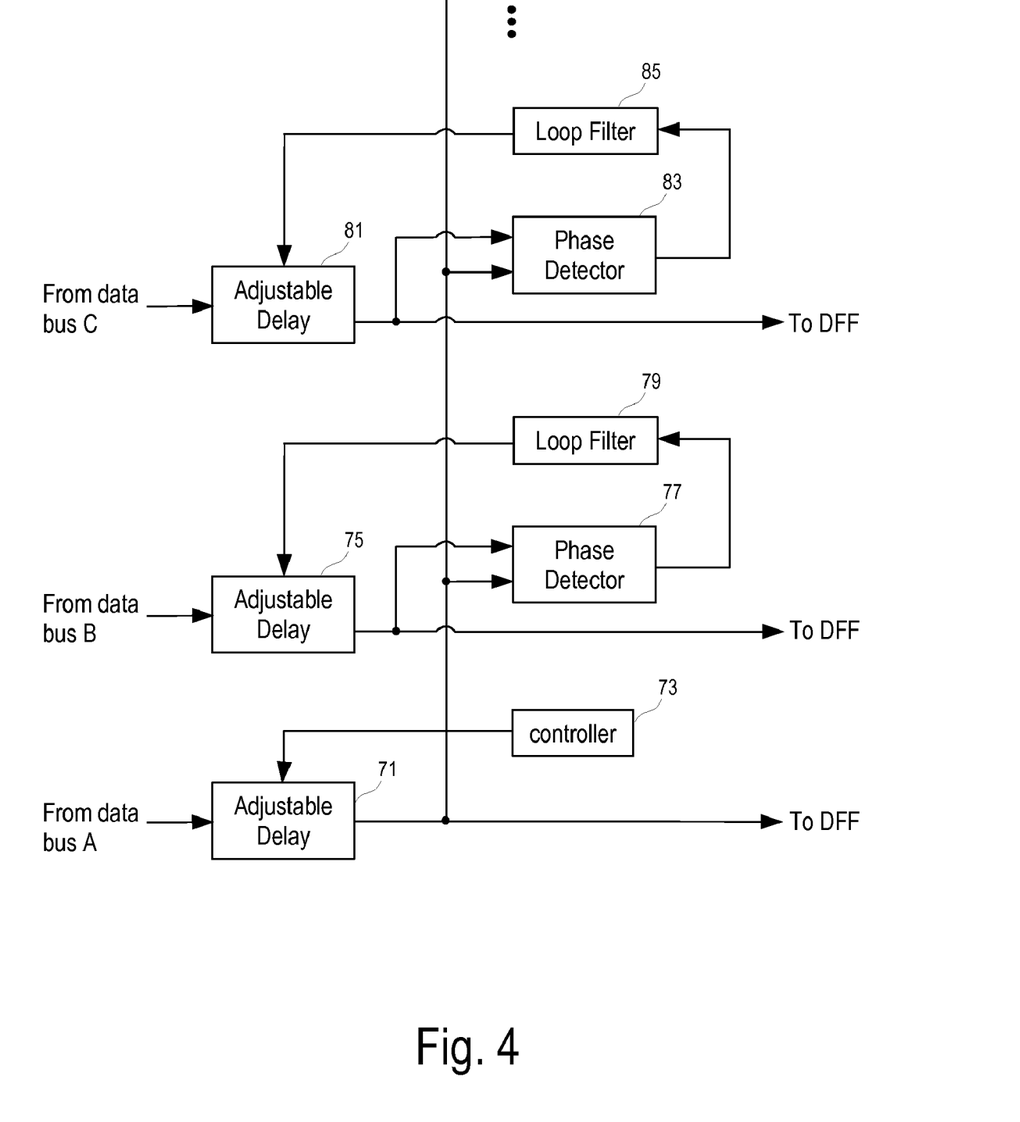
FIG. 4 shows a circuit for concurrent read calibration according to one embodiment.

FIG. 4 shows a circuit for concurrent read calibration according to one embodiment. In one embodiment, the adjustable delays (71, 75, 81, ...) are adjusted during a calibration phase and then fixed for subsequent operations. During the calibration phase, the same data pattern is read from the memory chips to adjust the delays (71, 75, 81, ...).

In one embodiment, the data bus A has the longest delay for receiving data over a plurality of data buses (e.g., data bus A, data bus B, data bus C, ...). The adjustable delay (71) is adjusted by the controller (73) to phase align with the read clock. Alternatively or in combination, the read clock may be adjusted to phase align with the data read back from the data bus A. Alternatively or in combination, the clock signal to be transmitted to the memory chips via the clock bus can be adjusted to phase align the date read back from the data bus A with the read clock.

In FIG. 4, the adjustable delays (75, 81, ...) for other buses are adjusted to match the delay for the bus A that has the longest delay such that the outputs of the adjustable delays (71, 75, 81, ...) have reduced phase differences.

For example, a phase detector (77) determines the phase difference between the outputs of the adjustable delay (71) and the adjustable delay (75), which outputs the sampled data signals from the bus A and bus B. The phase difference detected by the phase detector (77) is used to provide a feedback via the loop filter (79) to the adjustable delay (75) to reduce the phase difference between the outputs of the adjustable delay (71) and the adjustable delay (75). Thus, after a training period of reading the same data pattern from the data bus A and data bus B, the adjustable delay (75) can be adjusted to phase align the outputs of the adjustable delays (71 and 75).

In one embodiment, the phase detector (83) and the loop filter (85) is used to the adjustable delay (81) to phase align the phase align the outputs of the adjustable delays (71 and 81).

In one embodiment, the adjustable delays (75, 81, ...) are concurrently adjusted to compensate the delay differences along different data buses during the calibration phase. After the calibration phase, subsequent read operations can use the delays that are determined through the calibration to compensate the delay differences along different data buses. Thus, the outputs of the adjustable delays (71, 75, 81, ...) can be reliably sampled with a common read clock with increased time margin and jitter tolerance.

In one embodiment, the data to be transmitted from the advanced memory buffer over different data buses to memory chips are pre-skewed on the advanced memory buffer through a set of adjustable delays. The adjustment of the delays can be made manually or through a calibration phase such that the data signals arrived at the memory chips via the different data buses are phase aligned with clock signal arrived at the corresponding memory chips via the clock bus. Alternatively or in combination, the clock signal to be transmitted to the memory chips via the clock bus can also be adjusted for the phase alignment in write operations. Such a leveling method reduces or eliminates the skews generated due to different transportation distance and speed.

Figure 5:
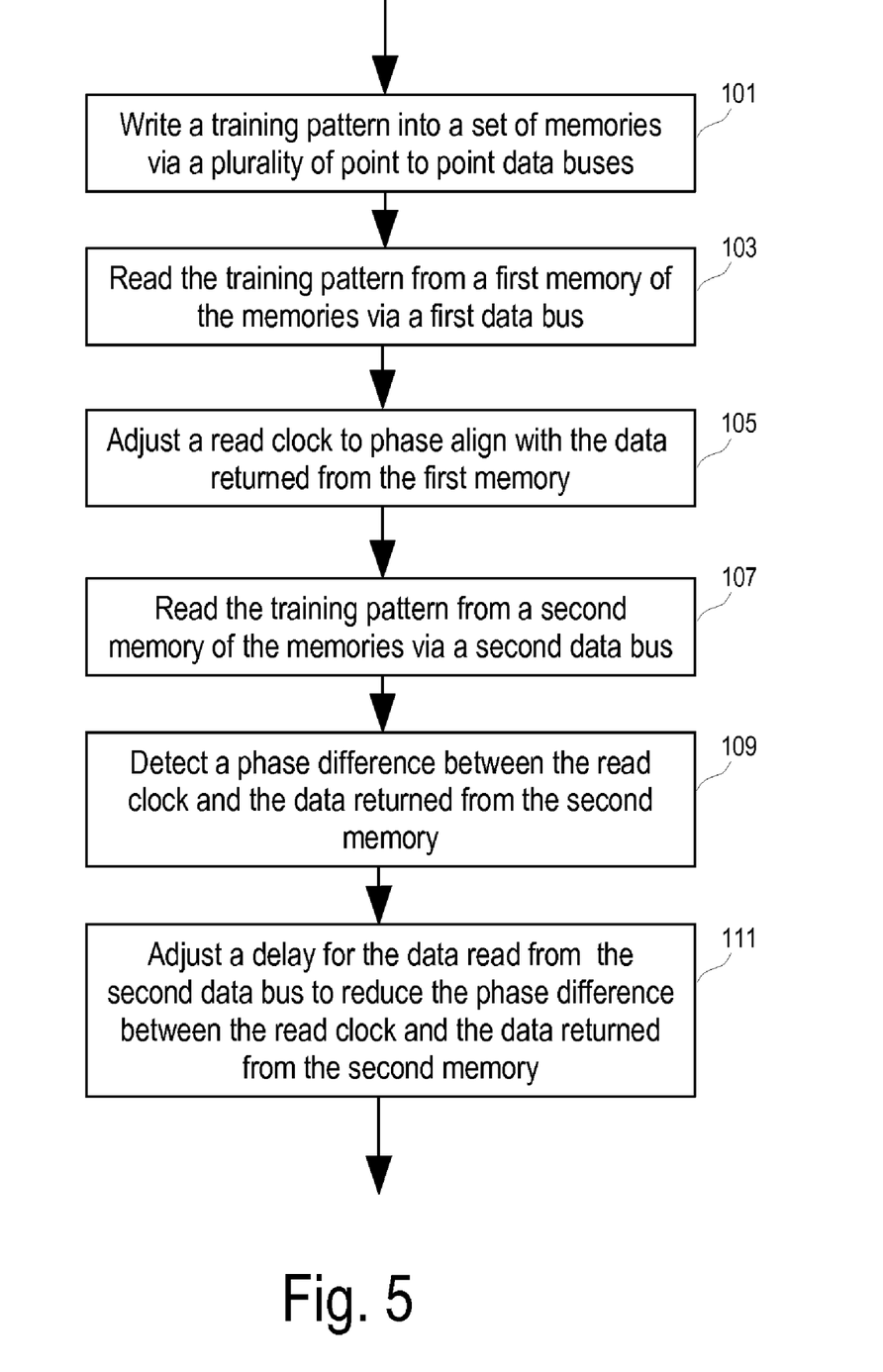
FIG. 5 shows a method to phase align read data according to one embodiment.

FIG. 5 shows a method to phase align read data according to one embodiment. In FIG. 5, after a training pattern (101) is written into a set of memories via a plurality of point to point data buses, the training pattern is read (103) from a first memory of the memories via a first data bus. A read clock (105) is adjusted to phase align with the data returned from the first memory via the first data bus. Alternatively or in combination, the data returned via the first data bus from the first memory is delayed to phase align with the read clock.

The training pattern is read (107) from a second memory of the memories via a second data bus. A phase difference between the read clock and the data returned from the second memory is detected (109) and used to adjust a delay for the data read from the second data bus to reduce the phase difference between the read clock and the data returned from the second memory. The operations (107, 109, 111) can be performed concurrently for a plurality of buses for phase alignment in read operations.

In one embodiment, phase aligning the read clock and the data read back from the first memory via the first data bus is performed concurrently with the operations to phase align the data read back from different memories via different data buses.

Figure 6:
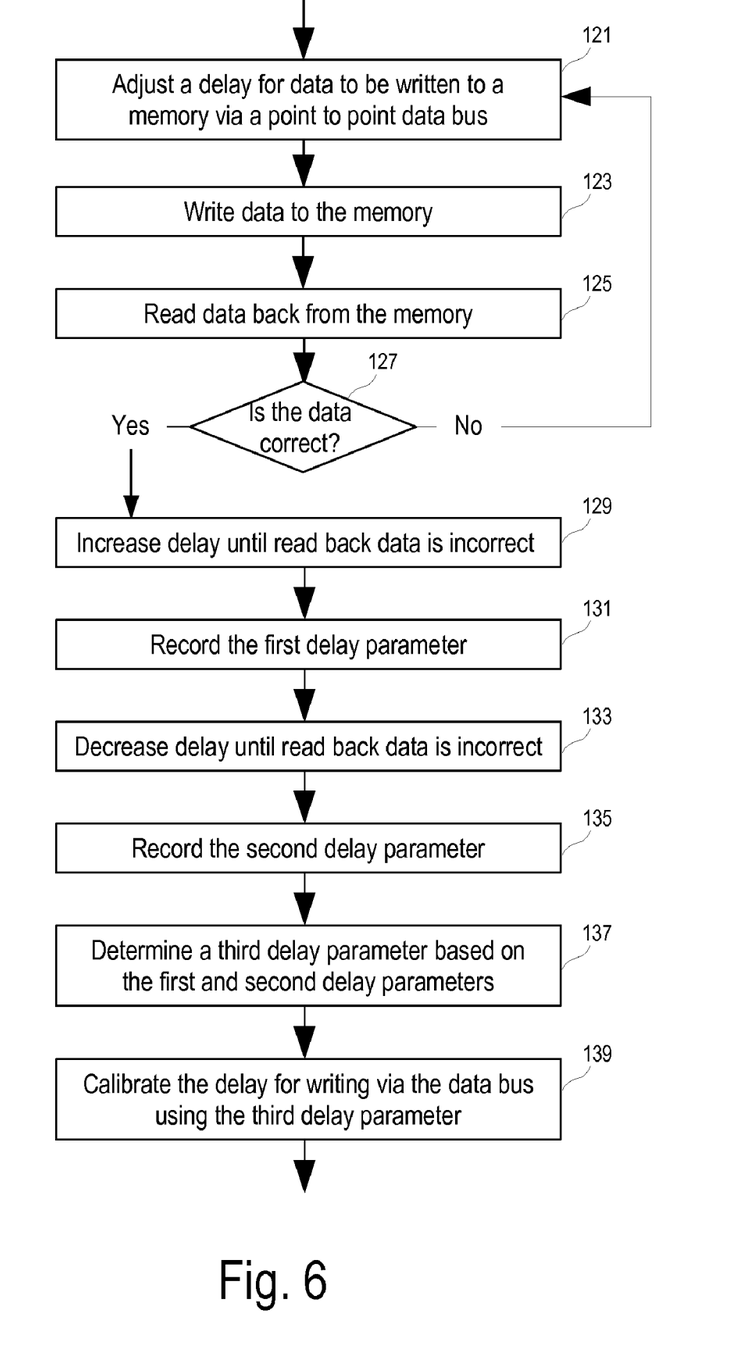
FIG. 6 shows a method to adjust delay for data to be transmitted from an advanced memory buffer according to one embodiment.

FIG. 6 shows a method to adjust delay for data to be transmitted from an advanced memory buffer according to one embodiment. In FIG. 6, operations 121-127 are performed repeatedly to adjust (121) a delay for data to be written to a memory via a point to point data bus, to write (123) data to the memory via the point to point data bus, and to read (125) the data back from the memory, until (127) the data read back from the memory matches the data written into the memory.

In FIG. 6, after the delay is adjusted to enable correct read/write from the memory via the point to point data bus, the delay is incrementally increased (129) until the read back data written through pre-delaying the data written into the memory via the data bus is incorrect. The delay amount corresponding to the swift from the correct read back to incorrect read back is recorded (131) as the first delay parameter.

In FIG. 6, after the delay is adjusted to enable correct read/write from the memory via the point to point data bus, the delay is incrementally decreased (133) until the read back data written through pre-delaying the data written into the memory via the data bus is incorrect. The delay amount corresponding to the swift from the correct read back to incorrect read back is recorded (135) as the second delay parameter.

A third delay parameter is determined (137) based on the first and second delay parameters; and the delay for writing via the data bus is calibrated (139) using the third delay parameter. For example, the third delay parameter can be the mid-point between the first and second delay parameters.

In one embodiment, the method of operations 121-139 is performed concurrently for a plurality of data buses to determine the delays for correctly writing the delayed data via a plurality of data buses.

Alternatively or in combination, a clock to be sent to the plurality of memories via a common clock bus can be adjusted to phase align the data arrived at a first memory via a first data bus; and the data transmitted via second data buses are pre-delayed on the advanced memory buffer for phase alignment with the clock signal arrived at the corresponding memories via the clock bus.

In one embodiment, an integrated circuit for an advanced memory buffer includes one flexible/adjustable delay leveling mechanism to reduce, compensate, or eliminate the skews among data read via different point to point data buses, and another flexible/adjustable delay mechanism to skew the data for transmission over the point to point data buses such that the data arrives in phase alignment with a clock signal arrived via a multi-drop clock bus. In one embodiment, the mechanisms are implemented in the DRAM interface of the advanced memory buffer.

In one embodiment, the Advanced Memory Buffer (AMB) is in accordance with a Joint Electron Device Engineering Council (JEDEC) standard.

In the foregoing specification, the disclosure has been provided with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An integrated circuit, comprising:
   an advanced memory buffer (AMB);
   a plurality of ports to interface the advanced memory buffer (AMB) with a plurality of data buses respectively; and
   a port to interface the advanced memory buffer (AMB) with a common clock bus for the plurality of data buses;
   wherein the advanced memory buffer (AMB) comprises an adjustable circuit coupled with the plurality of ports to level delays on the plurality of data buses; and
   wherein the adjustable circuit comprises a plurality of adjustable delay blocks and a calibration controller.

2. The integrated circuit of claim 1, wherein the plurality of data buses are point-to-point buses to memory chips.

3. The integrated circuit of claim 1, wherein the plurality of data buses are in accordance with a double data rate (DDR) standard or a quad data rate (QDR) standard.

4. An integrated circuit, comprising:
   a plurality of ports to interface respectively with a plurality of data buses;
   a port to interface with a common clock bus for the plurality of data buses; and
   an adjustable circuit coupled with the plurality of ports to level delays on the plurality of data buses;
   wherein the adjustable circuit comprises a plurality of adjustable delay blocks and a calibration controller;
   wherein the calibration controller determines a phase difference between data sampled from a first data bus and data sampled from a second data bus to adjust a delay block coupled with the second data bus.

5. The integrated circuit of claim 4, wherein the delay block is adjusted to reduce the phase difference.

6. The integrated circuit of claim 4, wherein the first data bus has longest delay among the plurality of data buses.

7. The integrated circuit of claim 4, wherein duration a calibration phase, a same data pattern is written into different memory chips via the plurality of data buses; and the data pattern is read through the plurality of data buses concurrently to adjust the plurality of delay blocks.

8. The integrated circuit of claim 4, wherein the calibration controller determines a phase difference between data sampled from a first data bus and a read clock to adjust a delay block coupled with the first data bus.

9. The integrated circuit of claim 4, wherein the calibration controller determines a phase difference between data sampled from a first data bus and data sampled from a third data bus to adjust a delay block coupled with the third data bus.

10. The integrated circuit of claim 9, wherein the calibration controller concurrently adjusts the delay block coupled with the second data bus and the delay block coupled with the third data bus.

11. An integrated circuit, comprising:
    a plurality of ports to interface respectively with a plurality of data buses;
    a port to interface with a common clock bus for the plurality of data buses; and
    an adjustable circuit coupled with the plurality of ports to level delays on the plurality of data buses;
    wherein the adjustable circuit comprises a plurality of adjustable delay blocks and a calibration controller;
    wherein the adjustable circuit further comprises a plurality of adjustable delay blocks to delay data to be transmitted through the plurality of data buses to phase align data at destinations of the data buses with a write clock transmitted over the clock bus.

12. The integrated circuit of claim 11, wherein the adjustable circuit further comprises an adjustable delay block to adjust a phase of the write clock for transmission over the clock bus.

13. A memory system, comprising:
    a plurality of memory chips;
    a common clock bus coupled with the plurality of memory chips;
    a plurality of point to point data buses coupled with the plurality of memory chips; and
    a memory buffer coupled with the plurality of memory chips via the common clock bus and the plurality of point to point data buses, the plurality of point to point data buses having different lengths between the memory chips and the memory buffer, the memory buffer comprising an adjustable circuit to level delays on the plurality of data buses.

14. The memory system of claim 13, wherein the memory buffer comprises an advanced memory buffer (AMB).

15. The memory system of claim 13, comprising a Fully Buffered Dual Inline Memory Module (FB-DIMM).

16. The memory system of claim 13, wherein the memory buffer comprises a calibration controller to concurrently adjust delays for reading from the plurality of data buses during a calibration phase.

17. The memory system of claim 13, wherein the advanced memory buffer (AMB) comprises a serial port configured to be connected to a host memory controller or to an adjacent advanced memory buffer (AMB).

18. A method during a calibration phase of a data processing system having a plurality of data buses, the data buses having different wire lengths, the method comprising:
    adjusting first delays applied to data to be transmitted over the plurality of data buses relative to a common write clock for correct write operations over the data buses; and
    adjusting second delays applied to data received over the plurality of data buses relative to a common clock to reduce phase differences among the received data.

19. The method of claim 18, wherein the plurality of data buses comprises a plurality of dual data rate memory buses; the first and second delays are integrated on an advanced memory buffer (AMB); and the second delays are adjusted concurrently during the calibration phase.

* * * * *